United States Patent
Brendel

(10) Patent No.: US 9,371,963 B2
(45) Date of Patent: Jun. 21, 2016

(54) LUBRICANT DISTRIBUTOR

(75) Inventor: Jürgen Brendel, Pottenstein (DE)

(73) Assignee: Baier and Koeppel GmbH and Co., Pegnitz (DE)

( * ) Notice: Subject to any disclaimer, the term of this patent is extended or adjusted under 35 U.S.C. 154(b) by 675 days.

(21) Appl. No.: 13/508,480

(22) PCT Filed: Nov. 6, 2009

(86) PCT No.: PCT/EP2009/064765
§ 371 (c)(1),
(2), (4) Date: Jul. 9, 2012

(87) PCT Pub. No.: WO2011/054395
PCT Pub. Date: May 12, 2011

(65) Prior Publication Data
US 2012/0273305 A1 Nov. 1, 2012

(51) Int. Cl.
*F16N 29/00* (2006.01)
*G01M 3/02* (2006.01)
(Continued)

(52) U.S. Cl.
CPC ............... *F16N 29/04* (2013.01); *F16N 7/385* (2013.01); *F16N 25/00* (2013.01); *F16N 2260/08* (2013.01); *F16N 2260/12* (2013.01); *F16N 2260/22* (2013.01)

(58) Field of Classification Search
CPC . F16N 7/385; F16N 2260/08; F16N 2260/12; F16N 2260/22; F16N 25/00; F16N 29/04
USPC .......................................................... 184/7.4
See application file for complete search history.

(56) References Cited

U.S. PATENT DOCUMENTS 3,064,759 A * 11/1962 Acker ............................ 184/7.4
3,526,297 A * 9/1970 Rotter et al. ................... 184/108
(Continued)

FOREIGN PATENT DOCUMENTS

CN 2090003 12/1991
CN 2851804 12/2006
(Continued)

OTHER PUBLICATIONS

"Translation of International Preliminary Report on Patentability", for International Application No. PCT/EP2009/64765, May 18, 2012, 12 pages.
(Continued)

*Primary Examiner* — William E Dondero
*Assistant Examiner* — Mark K Buse
(74) *Attorney, Agent, or Firm* — Pauly, DeVries Smith & Deffner, L.L.C.

(57) ABSTRACT

The invention relates to a lubricant distributor (1), in particular for use in central lubricating systems for machines, vehicles, construction machines, or agricultural machines, for conveying and distributing lubricant from a lubricant source to predetermined lubricant discharge points by means of one or more lines, comprising a main distributor (2). The lubricant distributor is characterized in that the lubricant distributor comprises at least one line-break monitor (3) for detecting a pressure drop in at least one line, and in that the at least one line-break monitor (3) is structurally arranged in or on the main distributor (2) in order to create a rigid unit comprising the main distributor (2) and the line-break monitor (3).

10 Claims, 8 Drawing Sheets

(51) Int. Cl.
  *F16N 25/00* (2006.01)
  *F16N 29/04* (2006.01)
  *F16N 7/38* (2006.01)

(56) References Cited

U.S. PATENT DOCUMENTS

| | | | | |
|---|---|---|---|---|
| 3,653,466 | A | * | 4/1972 | Fujita et al. ................... 184/7.4 |
| 4,520,902 | A | * | 6/1985 | Snow .............................. 184/7.4 |
| 4,522,229 | A | * | 6/1985 | Van de Moortele .......... 137/460 |
| 4,732,190 | A | * | 3/1988 | Polselli ......................... 137/460 |
| 5,058,709 | A | | 10/1991 | Saam |
| 6,241,212 | B1 | * | 6/2001 | Takahashi et al. .............. 251/44 |
| 2009/0057063 | A1 | * | 3/2009 | Marek ............................ 184/7.4 |

FOREIGN PATENT DOCUMENTS

| | | |
|---|---|---|
| DE | 10318671 | 11/2004 |
| DE | 202008007080 | 9/2008 |
| GB | 1405494 | 9/1975 |
| WO | 8705375 | 9/1987 |

OTHER PUBLICATIONS

"International Search Report for Priority Application PCT/EP2009/64765", Jul. 26, 2010, 14 pages.

Office Action, for Chinese Patent Application No. 2009801632769 mailed Jul. 10, 2014 (9 pages).

* cited by examiner

LUBRICANT DISTRIBUTOR

CROSS-REFERENCE to RELATED APPLICATIONS

This application is a national stage application under 35 U.S.C. 371 of International Patent Application Serial No. PCT/EP2009/064765, entitled "LUBRICANT DISTRIBUTOR", filed Nov. 6, 2009, the disclosures of which are incorporated herein by reference.

SUMMARY

The invention relates to a lubricant distributor, in particular for use in central lubrication systems for machines, vehicles, construction or agricultural machines for conveying and distributing lubricant from a lubricant source via one or more lines to predefined lubricant supply points, in accordance with the preamble of claim 1.

In central lubrication systems, the problem frequently occurs that the fracture of a line can often be determined or localized with difficulty on account of a widely ramified line network. In central lubrication systems which have one or more progressive distributors, there is the problem, moreover, that, in the case of a line rupture downstream of the progressive distributor, the progressive (gradual) actuation of the metering plungers is interrupted as a result of the pressure drop in the ruptured line, with the result that backing up of lubricant is produced, and in any case the further lines which emanate from the progressive distributor are no longer supplied with lubricant and serious consequential damage can thus occur.

Backing up of lubricant, as described above, is often the result of a line rupture if a progressive distributor or a similar arrangement is connected in between. The interruption of the lubricant feed to a lubricating point can have serious consequences, in particular if machine parts to be lubricated "jam into one another", for example in agricultural machines, as a result of which considerable damage can occur on the entire machine, which damage can also be associated with considerable risks for the operator of the machine.

DE 103 18 671 has disclosed a central lubrication system having a lubricant distributor of the type which is addressed here. Furthermore, said document discloses using line rupture monitors in order to detect a line rupture, which line rupture monitors are configured as pressure sensors and are arranged in associated lines. However, this solution for monitoring line ruptures has the disadvantage that it is associated with high costs and can be realized only with relatively high outlay.

It is therefore an object of the present invention to provide a line monitoring means in a central lubrication system, which line monitoring means can be realized particularly simply and inexpensively.

In order to achieve this object, a lubricant distributor having the features of claim 1 is proposed, which lubricant distributor serves, in particular, for use in central lubrication systems for machines, vehicles, construction or agricultural machines for conveying and distributing lubricant from a lubricant source via one or more lines to predefined lubricant supply points. The lubricant distributor has a basic distributor and is distinguished by the fact that it has at least one line rupture monitor for the detection of a pressure drop in at least one associated line, the line rupture monitor being arranged structurally in or on the basic distributor, in order to provide a rigid unit comprising the basic distributor and the line rupture monitor. This arrangement has the advantage that the line rupture monitor can be realized particularly simply and inexpensively by the line rupture monitor being arranged simply structurally in or on the basic distributor and thus forming a compact unit. Moreover, the lubricant distributor according to the present invention can be used in a particularly flexible manner. The line rupture monitor can be connected in one piece to the basic distributor. However, it is preferably provided that the line rupture monitor can be connected releasably to the basic distributor.

A lubricant distributor, in particular a progressive distributor, is particularly preferred which is distinguished by the fact that the at least one line rupture monitor comprises one or more line rupture monitor modules. Furthermore, one or more line rupture monitor modules can preferably be added, removed or exchanged, with the result that the line rupture monitor can be used in a very flexible manner and, in particular, can interact with virtually every basic distributor. Moreover, as a result of the advantageous modular construction, the line rupture monitor can have any desired number of line rupture monitor modules, it being possible for the line rupture monitor to be changed at any time and, as a result, to be adapted, for example, to other basic distributors. The line rupture monitor modules are preferably of disk-shaped configuration, the width and/or length of a line rupture monitor module therefore substantially exceeding its thickness. In this way, they are particularly satisfactorily suitable for use with basic distributors of modular configuration. Moreover, the disk-shaped construction of a line rupture monitor module is advantageous, since the outlets of the basic distributor, with which the line rupture monitor modules preferably interact, are at only a limited spacing from one another.

Furthermore, a lubricant distributor is preferred, in which a line rupture monitor has one or more line rupture monitor modules, of which at least one is an empty module. In this way, functional line rupture monitor modules, that is to say not empty modules, can monitor particularly important lubricating points, whereas less critical lubricating points are not monitored. The corresponding distributor outlets of the basic distributor which are assigned to unimportant lubricating points can then be occupied by corresponding empty modules.

Furthermore, a lubricant distributor is preferred which is distinguished by the fact that the line rupture monitor or a line rupture monitor module is operatively connected to a connection element which is assigned to a distributor outlet of the basic distributor. If the line rupture monitor comprises a plurality of line rupture monitor modules, they are preferably all operatively connected to in each case one connection element which are assigned to in each case one defined distributor outlet of the basic distributor. The lubricant distributor can be realized particularly simply by this arrangement. Furthermore, existing basic distributors can be retrofitted simply with a line rupture monitor by way of this embodiment.

Finally, another lubricant distributor is preferred, in which a line rupture monitor or a line rupture monitor module comprises a feeler plunger which is mounted movably in a hole. The feeler plunger is preferably spring-mounted in the hole, with the result that the feeler plunger can be displaced in the hole counter to the force of the spring. The position of the feeler plunger in the hole depends otherwise on the fluid pressure in an associated connection element. The feeler plunger preferably interacts by way of suitable means with a detection device which detects a pressure drop in an associated connection element. The detection device preferably has electric and/or optical components.

Although the lubricant plunger can be arranged in a branching piece of a lubricant channel, which branching piece is closed at the end side, it is preferred if the feeler plunger is positioned in such a way that it feels the lubricant pressure laterally at a channel, through which lubricant flows, in such a way that a continuous lubricant exchange on the end side of the feeler plunger is ensured.

In order to achieve the abovementioned object, a central lubrication system is proposed, moreover, which comprises a lubricant distributor according to the invention.

Finally, in order to achieve the abovementioned object, a line rupture monitor is also proposed which can be connected to a lubricant distributor.

BRIEF DESCRIPTION OF THE DRAWINGS

In the following text, the invention will be explained in greater detail using the drawing, in which.

DETAILED DESCRIPTION

Figure 1:
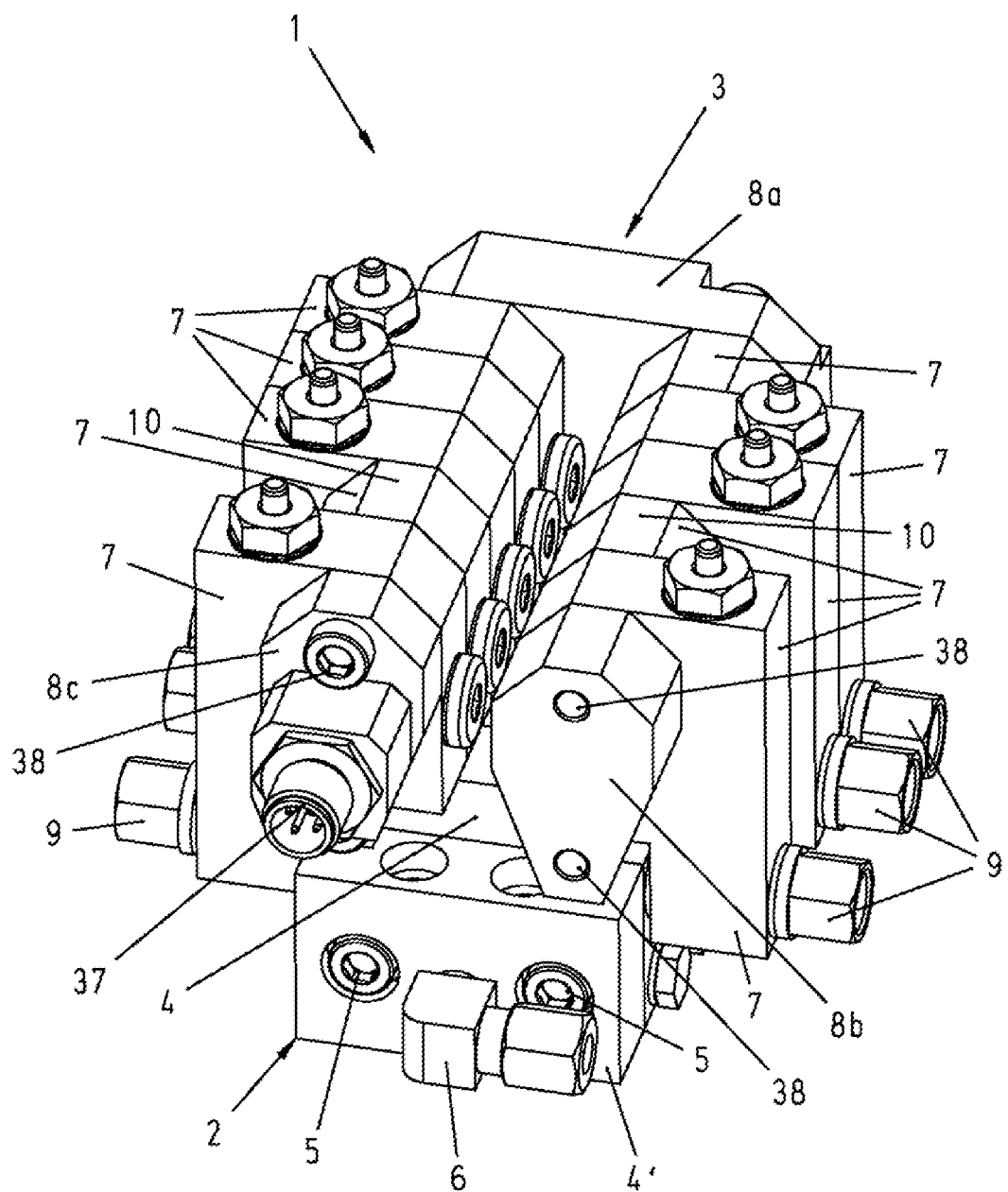
FIG. 1 shows a first perspective illustration of a lubricant distributor according to the invention.

FIG. 1 shows a perspective illustration of a lubricant distributor 1 according to the present invention. The lubricant distributor 1 comprises a basic distributor 2 and a line rupture monitor 3. The basic distributor 2 can be, for example, a known progressive distributor, but in principle the basic distributor 2 can be of any desired configuration. The basic distributor 2 comprises a plurality of distributor outlets which cannot be seen here and from which a fluid, in particular a lubricant, is conveyed to the lubricating points via corresponding lines which are likewise not shown here.

In FIG. 1, the basic distributor 2 is of modular configuration merely by way of example, that is to say comprises a plurality of basic distributor modules 4 which are connected to one another via connecting elements 5, in particular via hexagon socket screws. The configuration of the basic distributor 2 in a variable disk design has the advantage that the basic distributor 2 can be extended or shortened as desired depending on the number of lubricating points to be supplied. Moreover, the basic distributor 2 has a distributor inlet in a starter module 4', in which distributor inlet an inlet element 6 is arranged which receives lubricant from a lubricant source (not shown here).

In the exemplary embodiment according to FIG. 1, the line rupture monitor 3 which is part of the lubricant distributor 1 comprises a plurality of line rupture monitor modules 7 which are arranged on the basic distributor 2. However, it is also conceivable in principle to arrange the line rupture monitor 3 in the basic distributor. The line rupture monitor modules 7 are kept together by end pieces, of which a total of three are provided here. The end piece 8a serves to connect the two "rows" of line rupture monitor modules 7 which extend on both sides of the basic distributor 2. The end piece 8b delimits a row of a plurality of line rupture monitor modules 7 on the side which lies opposite the end piece 8a. The end piece 8c firstly serves likewise to delimit a row of a plurality of line rupture monitor modules 7 on the side which lies opposite the end piece 8a, and secondly serves to produce a connection to at least one further line rupture monitor 3 and/or to an evaluation device. In the embodiment according to FIG. 1, a total of ten line rupture monitor modules 7 are provided which are connected to one another by means of suitable connecting means. The connection of the individual line rupture monitor modules 7 and the connection of a plurality of line rupture monitors 3 will be described in greater detail in the description with respect to FIG. 6.

A line rupture monitor module 7 is assigned in each case one connection element 9, each connection element in turn being assigned to one of the distributor outlets (which cannot be seen here) of the basic distributor. It is preferably provided that each basic distributor module 4 has two distributor outlets which lie opposite one another, with the result that each basic distributor module 4 is therefore assigned two connection elements 9 and two line rupture monitor modules 7.

FIG. 1 also makes it clear that two of the total of ten line rupture monitor modules 7 which are shown are configured as empty modules 10 which, in contrast to the remaining eight line rupture monitor modules 7, do not have a monitoring function, which therefore cannot detect a line rupture in an associated line and serve as "gap fillers", in particular for data and/or power transmission, as will also become clear later.

Figure 2:
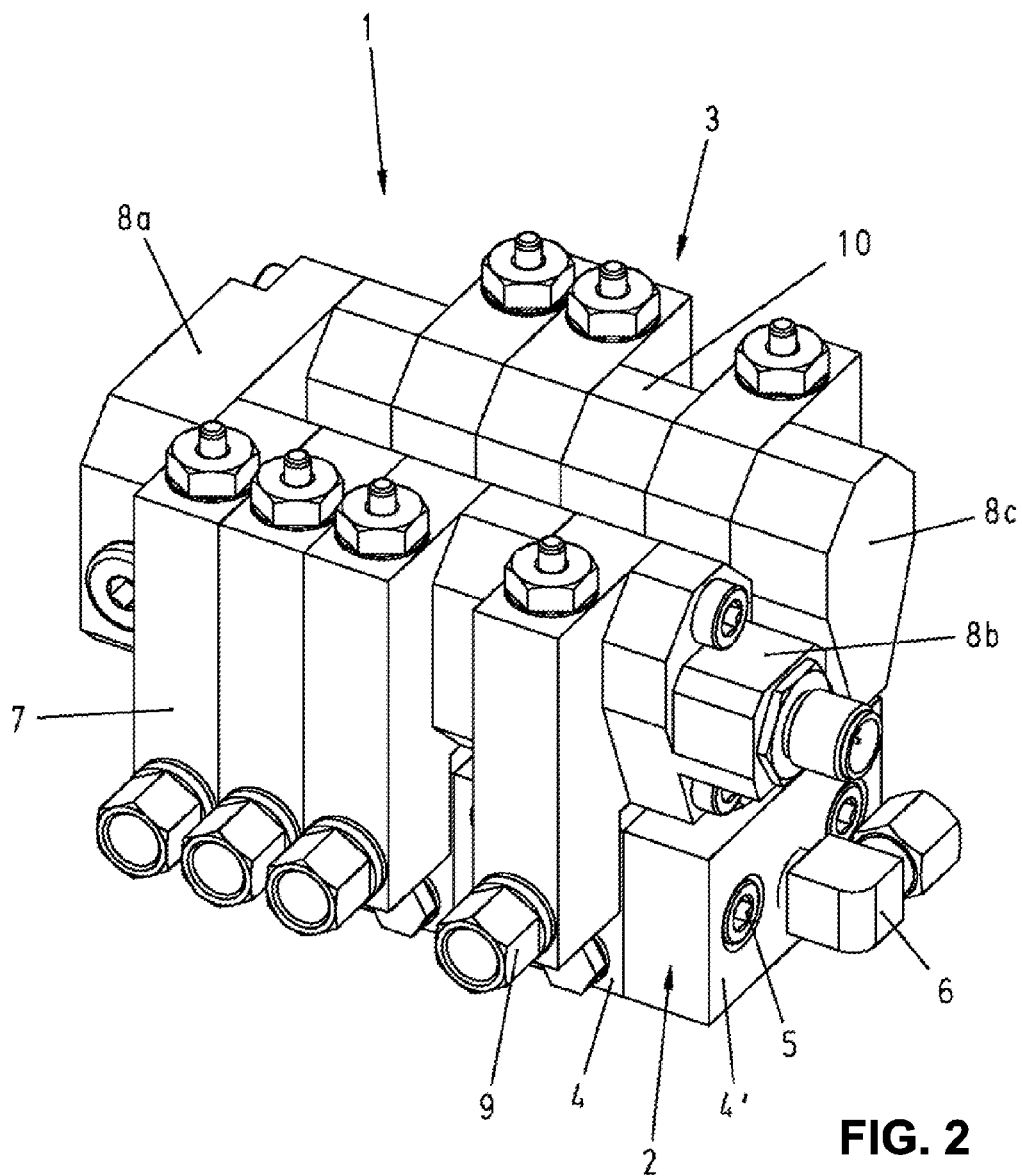
FIG. 2 shows a second perspective illustration of the lubricant distributor according to the invention.

FIG. 2 shows a second perspective illustration of the lubricant distributor 1 from another viewing direction. In order to avoid repetitions, identical parts are provided with identical designations, with the result that reference is made to this extent to the description with respect to FIG. 1.

In FIG. 2, once again the basic distributor 2 and the total of ten line rupture monitor modules 7 can be seen. Moreover, the end pieces 8a, 8b and 8c can be seen which delimit the line rupture monitor modules 7 or connect them to one another. Moreover, the connection elements 9 can also be seen which are connected to the line rupture monitor modules 7.

Figure 3:
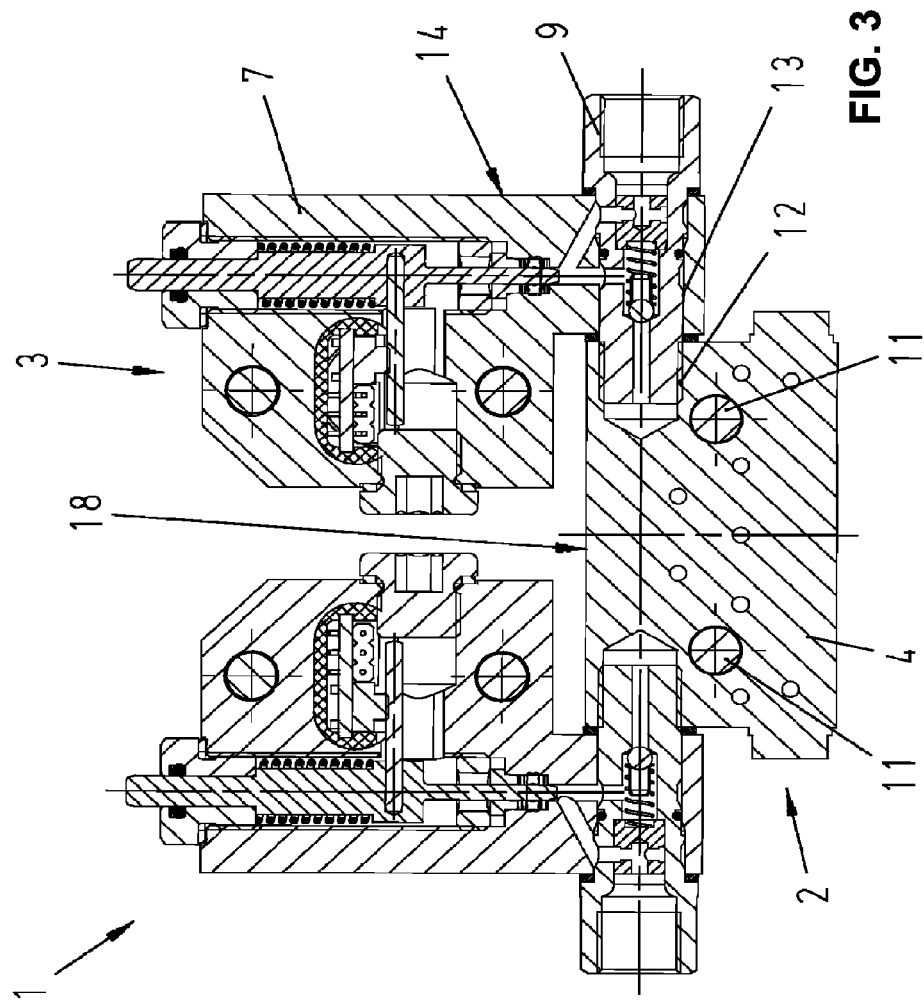
FIG. 3 shows a cross section through the lubricant distributor.
Figure 4:
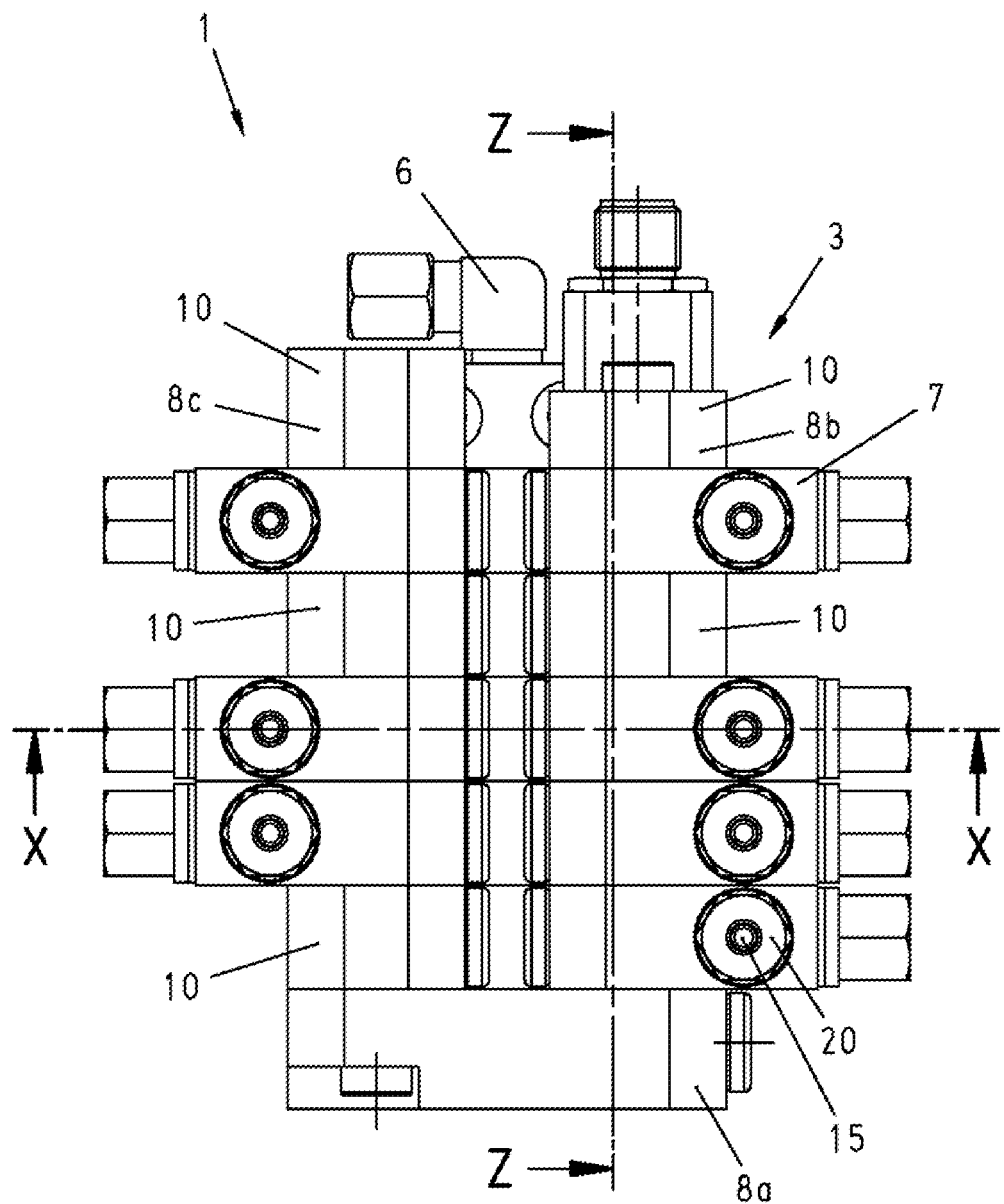
FIG. 4 shows a plan view of the lubricant distributor.

FIG. 3 shows a cross section along the sectional line X-X which is shown in FIG. 4 through a lubricant distributor 1 according to the invention. Identical parts are provided with identical designations, with the result that reference is made to this extent to the description with respect to the preceding figures, in order to avoid repetitions.

In FIG. 3, the basic distributor 2 or a basic distributor module 4 can be seen which has holes 11 for receiving the connecting elements 5 which are shown in FIGS. 1 and 2. The basic distributor module 4 has a distributor outlet 12, in which the connection element 9 is arranged, in order to provide a fluid connection to the lubricating points (not shown here) to be supplied. In the example which is shown here, the connection element 9 can be screwed into the distributor outlet 12.

The line rupture monitor module 7 has a through hole 13 for receiving the connection element 9. The connection element 9 therefore as it were penetrates the line rupture monitor module 7, as can otherwise also be seen in FIG. 2. The line rupture monitor module 7 can therefore be connected particularly simply to the basic distributor module 4 by the connection element 9 being introduced from a side face 14 of the line rupture monitor module 7 into the through hole 13 and the connection element 9 subsequently being screwed into the distributor outlet 12. O-rings or the like can be provided in order to seal the line rupture monitor module 7 with respect to the basic distributor module 4.

Figure 3A:
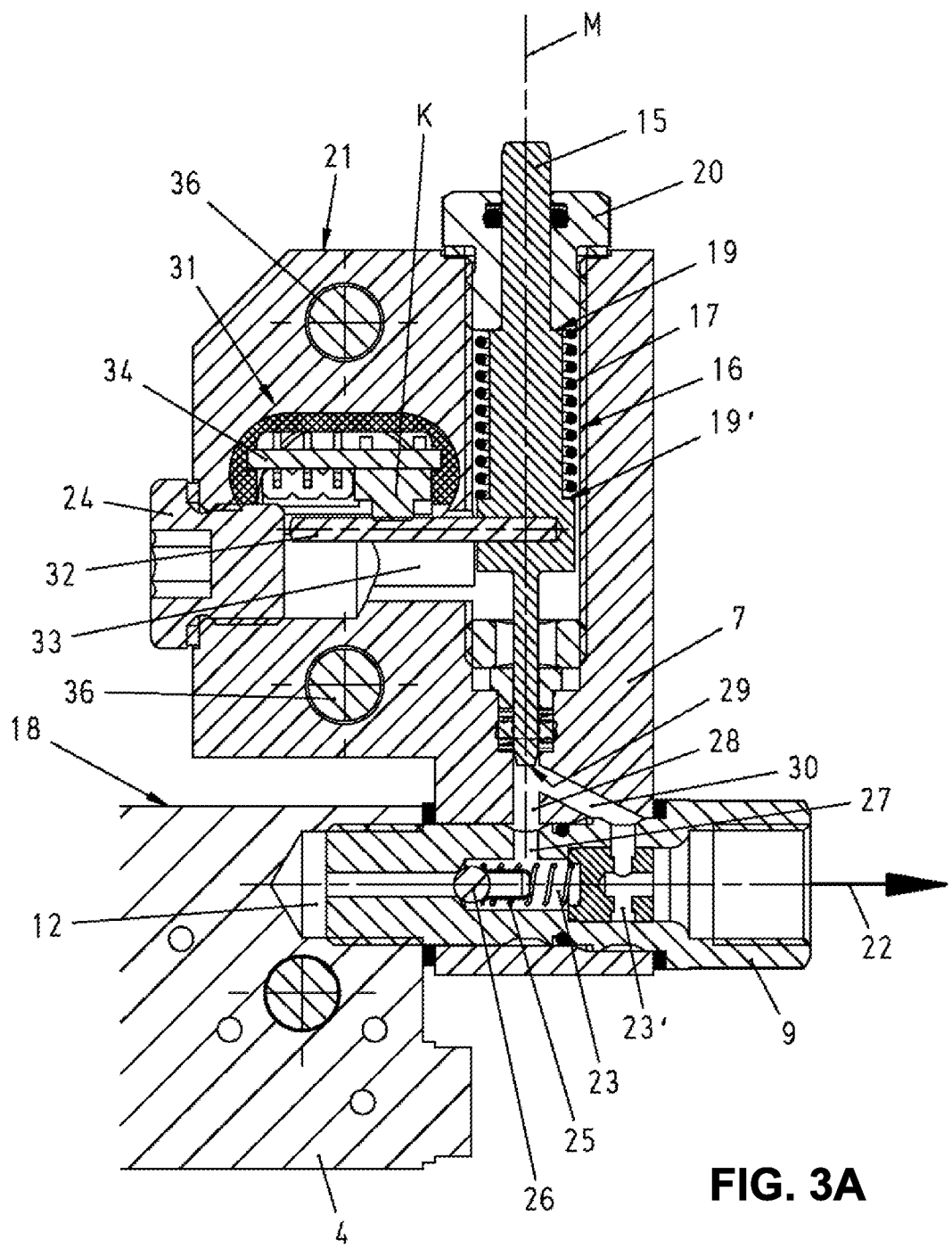
FIG. 3a shows an enlarged illustration of a part region of FIG. 3.

For the detailed description of the line rupture monitor module 7 which is shown in FIG. 3, reference is made to FIG. 3a, in which a detail of FIG. 3 is shown on an enlarged scale for improved clarity. Identical parts are provided with identical designations, with the result that reference is made to this extent to the description with respect to the preceding figures, in order to avoid repetitions.

The line rupture monitor module 7 comprises a feeler plunger 15 which can be displaced in a hole 16 counter to the force of an elastic element, here by way of example counter to the force of a spring 17. The center axis M of the hole 16 preferably extends in a direction which lies perpendicularly on a plane, in which the upper side 18 of the basic distributor 2 is arranged when the line rupture monitor module 7 is connected to the basic distributor 2. The feeler plunger 15 has a projection 19 which interacts with a stop element 20 which is arranged in the region of the upper side 21 of the line rupture monitor module 7. Moreover, the feeler plunger 15 has a further projection 19', on which the spring 17 is supported. The spring 17 therefore bears on one side against the stop element 20 and on the other side against the projection 19' of the feeler plunger 15, and therefore exerts a force on the feeler plunger 15 in the direction of the connection element 9.

The connection element 9 preferably comprises a nonreturn valve which guides a fluid in the direction of the arrow 22 to the corresponding lubricating point only when there is sufficient pressure in the basic distributor 2 or in the distributor outlet 12.

The hole 16 which receives the feeler plunger 15 is connected fluidically to a fluid chamber 23 of the connection element 9. The fluid chamber 23 of the connection element 9 is in turn connected fluidically to the distributor outlet 12 of the basic distributor 2, in order to guide a fluid, in particular a lubricant, out of the basic distributor 2 via a line which is connected to the connection element 9 to the corresponding lubricating points. As said, the connection element 9 preferably comprises a nonreturn valve and has a closure element 26 which can be displaced counter to the force of an elastic element 25.

The closure element 26 opens a fluid connection to the fluid chamber 23 of the connection element 9 only when the fluid pressure of the lubricant reaches a predefined magnitude in the distributor outlet 12. Nonreturn valves of this type are described many times in the prior art, with the result that further details will not be given here. The fluid which thereupon passes into the fluid chamber 23 can then pass via an opening 27 in the wall of the connection element 9 into a hole section 28, where it exerts a force on a connection-side end side 29 of the feeler plunger 15. The feeler plunger 15 is sealed with respect to the hole 16 by means of suitable sealing elements, with the result that no fluid can pass out of the hole section 28 into the hole 16. Furthermore, a relief hole 30 is provided in the line rupture monitor module 7, which relief hole 30 is connected on one side to the hole section 28 and on the other side to a fluid chamber 23' and thus allows the lubricant to flow out of the hole section 28 back into the connection element 9. The connection element 9 is preferably configured in such a way that it does not produce a direct connection between the valve outlet 12 and a line which is connected to the connection element 9. Rather, the fluid is guided out of the fluid chamber 23 via the hole section 28 and the relief hole 30 which together as it were form a bypass fluid path, back into the fluid chamber 23' of the connection element 9. The fluid is therefore preferably diverted completely via the bypass fluid path. To this end, the connection element 9 either has two blind bores which, starting from both end sides, are made in the connection element and form the fluid chambers 23 and 23', or the connection element 9 is provided with a through hole, in which a closure plug is arranged between the connection element-side openings of the hole section 28 and the relief hole 30. However, it is also conceivable to guide the fluid merely in parallel via the hole section 28 and the relief hole 30. A fluid flow then flows additionally through the connection element 9 which forms a second fluid path in this case. It goes without saying that the position and the dimension of the opening 27 in the wall of the connection element 9 and of the hole element 28 have to be adapted to one another in such a way that a fluid connection between said two elements is ensured when the line rupture monitor module is fastened to the basic distributor 2.

FIGS. 3 and 3a show the feeler plunger 15 in a "normal position", that is to say the lubricant in the connection element 9 has a normal pressure which pushes the feeler plunger 15 counter to the force of the spring 17 into a first functional position, in which the feeler plunger preferably bears against the projection 19 of the stop element 20. Here, "normal pressure" is to be understood to mean the pressure which prevails in the central lubrication system in the disruption-free state.

FIG. 3a also makes it clear that the line rupture monitor module 7 has a detection device 31 which indicates a pressure drop in the connection element 9 or in the associated line. To this end, the detection device 31 detects the axial position of the feeler plunger 15 in the hole 16 in relation to the center axis M. In order to detect the position of the feeler plunger 15, the latter has a radial element 32 which extends in the radial direction of the feeler plunger 15, that is to say perpendicularly with respect to the center axis M, into a cavity 33 of the line rupture monitor module 7, which cavity 33 is connected to the hole 16. As shown in FIG. 3a, for example, the radial element 32 can be mounted in a radial hole which is made in the feeler plunger 15. However, it is also conceivable to adhesively bond, to screw, or the like, the radial element 32 to the feeler plunger 15. The radial element 32 can also be formed in one piece with the feeler plunger 15. The cavity 33 is accessible from the outside, in particular for maintenance purposes, a closure 24 being provided which closes the cavity 33 during operation of the line rupture monitor module 7.

In the "normal position" of the feeler plunger 15, the radial element 32 bears against a contact element K which can be configured, for example, as an electric switch or the like and is connected to a corresponding board 34. The board can be provided, for example, with an electric circuit which makes it possible to detect contact of the radial element 32 and the contact element K, for example by closing of an electric circuit, and to indicate it to an operator. Correspondingly, the detection device 31 can detect when the radial element 32 does not make contact with the contact element K, that is to say the feeler plunger 15 is situated in a second functional position.

The second functional position is assumed in the case of a displacement of the feeler plunger 15 in the hole along the center axis M in the direction of the arrow 35. The feeler plunger 15 is displaced in the hole 16 in the direction of the connection element 9, in particular, when the force of the spring 17 exceeds the fluid pressure which is exerted on the end side 29 of the feeler plunger 15. This can be the case, for example, when an associated line is ruptured and the relevant line therefore supplies less fluid or no longer supplies fluid to the lubricating point. The pressure which is necessary in the connection element 9 for the "normal position" of the feeler plunger 15 can be set by the spring force of the spring 17. In this second functional position of the feeler plunger 15, the radial element 32 is no longer in contact with the contact element K, which can be detected by the detection device 31, for example by a circuit being opened or a light barrier being interrupted.

Here, the detection device 31 is realized purely by way of example by an electric circuit. However, it is also conceivable to detect the position of the feeler plunger 15 and/or of the radial element 32 by means of a laser, in particular a laser barrier with corresponding mirror faces or the like. It is critical that the detection device 31 can detect a first and a second functional position of the feeler plunger 15, the second functional position indicating a pressure drop in the associated line. The detection device 31 can preferably also generate a corresponding signal which can be indicated to an operator.

Figure 6:
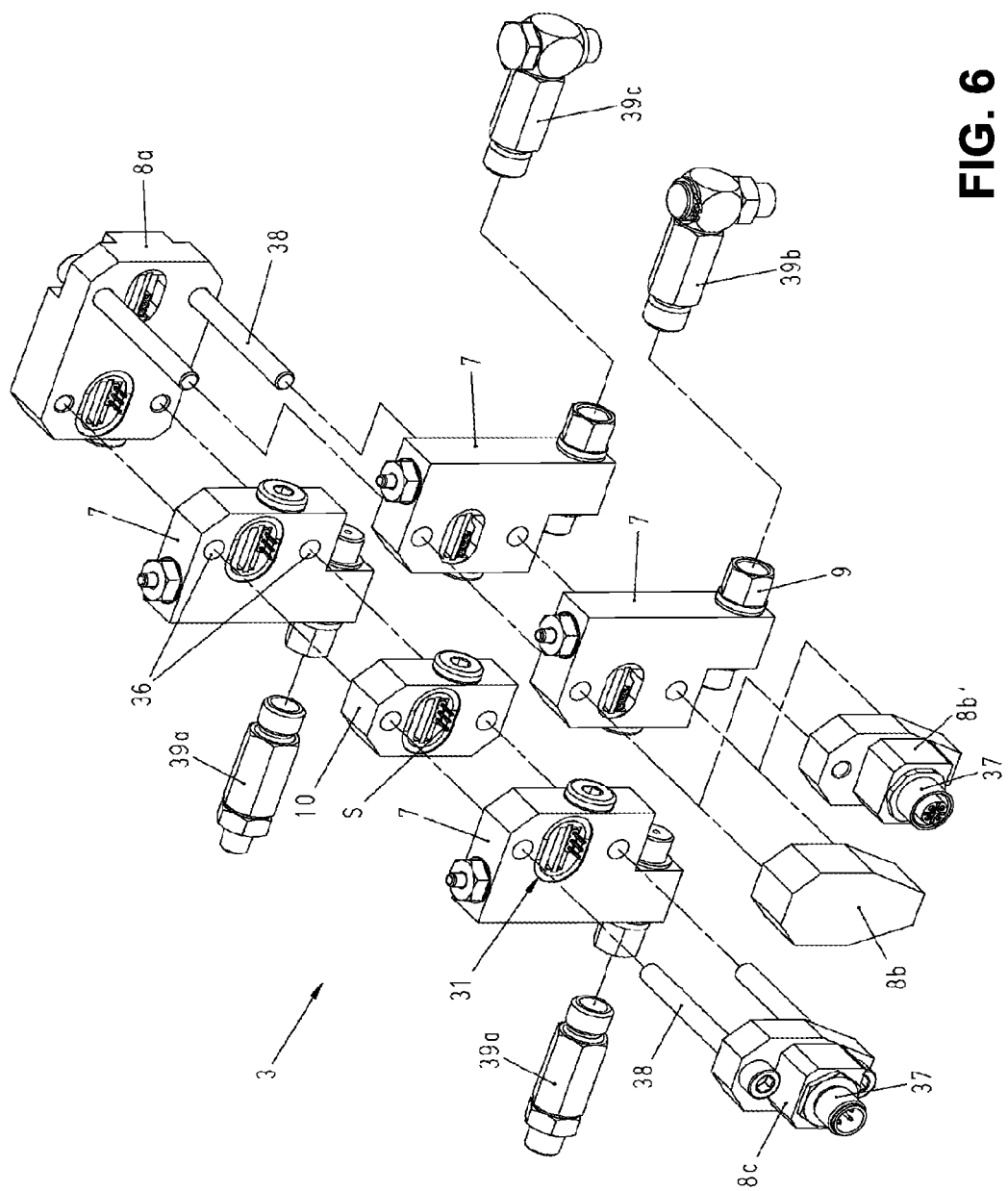
FIG. 6 shows an exploded illustration of a line rupture monitor according to the invention.

In FIG. 3a, two holes 36 can also be seen which serve to receive connecting elements, as will also become clear in the description with respect to FIG. 6, in order to connect a plurality of line rupture monitor modules 7 to one another.

FIG. 4 shows a plan view of a lubricant distributor 1 according to the invention. Identical parts are provided with identical designations, with the result that reference is made to this extent to the description with respect to the preceding figures, in order to avoid repetitions.

FIG. 4 once again makes it clear that the lubricant distributor 1 comprises a plurality of line rupture monitor modules 7 which can also be configured as empty modules 10. The line rupture monitor modules 7 and 10 are preferably arranged next to one another and are in contact with one another. In the present exemplary embodiment of a line rupture monitor 3, a total of three elements are provided which form the end pieces 8a, 8b and 8c of the line rupture monitor 3.

It becomes clear that each distributor outlet 12 is preferably assigned a line rupture monitor module 7. However, the associated line rupture monitor modules 7 can also be configured as empty modules which therefore merely serve as gap fillers between two line rupture monitor modules 7, with the result that the empty modules 10 at least cannot indicate a line rupture.

It goes without saying that the line rupture monitor 3 does not have to consist of individual line rupture monitor modules 7, but rather it is also conceivable that the line rupture monitor 3 is configured in one piece, that is to say the line rupture monitor modules 7 are not exchangeable, but rather are connected to one another nonreleasably. The line rupture monitor modules are preferably of disk-shaped configuration, the width of a line rupture monitor module preferably corresponding to the width of a basic distributor module 4.

Each line rupture monitor module 7 preferably has a detection device 31. It is particularly advantageous if the empty modules 10 have corresponding means, in order to produce an electric and/or optical connection between individual functioning line rupture monitor modules 7 with respect to one another.

Figure 5:
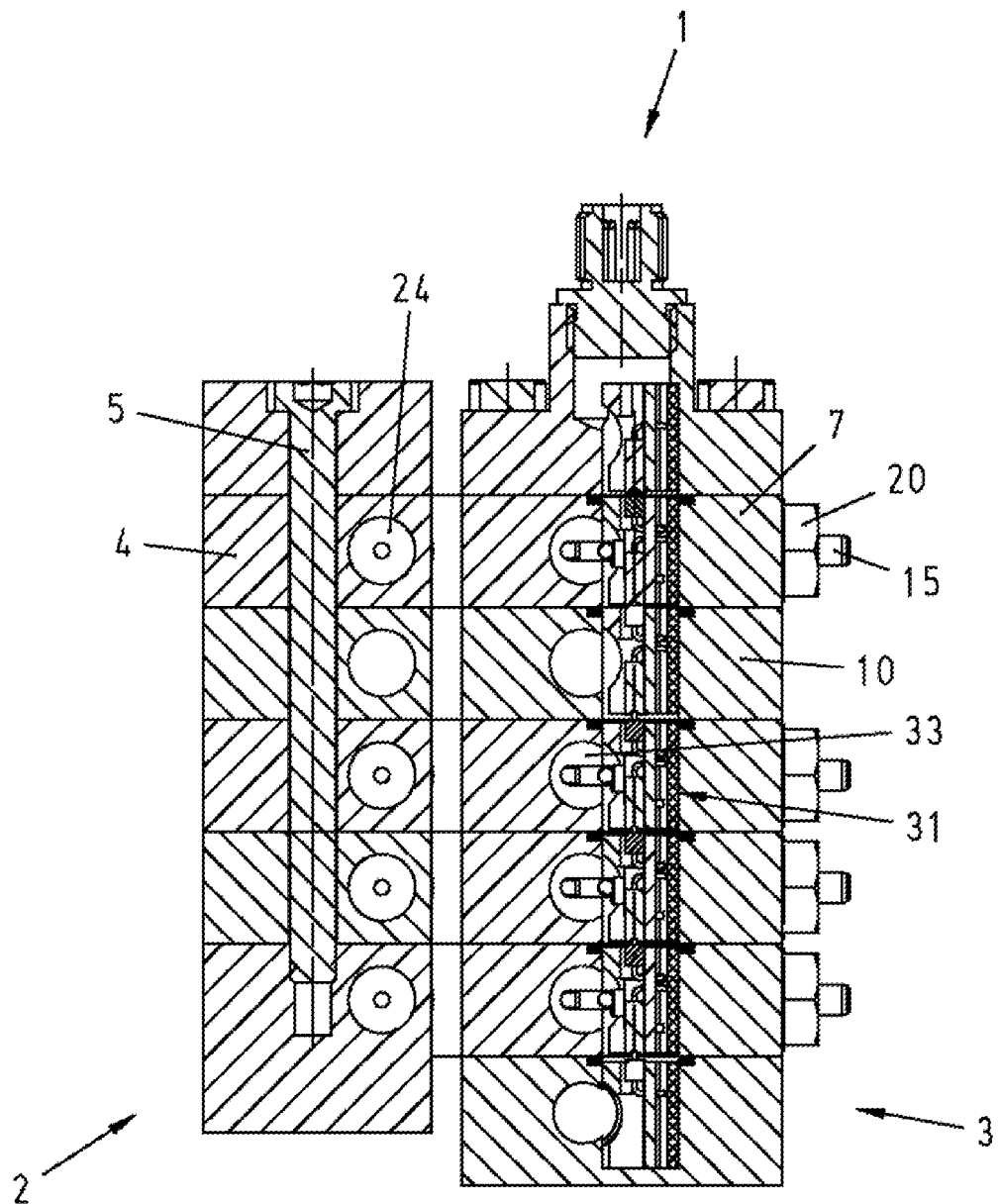
FIG. 5 shows a longitudinal section through the lubricant distributor.

FIG. 5 shows a longitudinal section through the lubricant distributor 1 according to the invention along the sectional line Z-Z which is shown in FIG. 4. Identical parts are provided with identical designations, with the result that reference is made to this extent to the description with respect to the preceding figures, in order to avoid repetitions.

FIG. 5 makes it particularly clear that each basic distributor module 4 is preferably assigned two line rupture monitor modules 7; the line rupture monitor modules 7 can also be empty modules 10. It is conceivable, for example, to assign a functional line rupture monitor module 7 only to those distributor outlets 12 of a basic distributor 2 which supply particularly important lubricating points with lubricant. It can also be provided, for example, that one or more basic distributor modules 4 are configured as it were as empty modules 4 which are therefore not assigned to any lubricating point and also do not have a corresponding connection element. Otherwise, FIG. 5 also shows the connecting element 5 which connects the individual basic distributor modules 4 to one another.

It goes without saying that the modular configuration of the basic distributor 2 here is exemplary. It goes without saying that it is conceivable to configure the basic distributor 2 in one piece, that is to say to connect the basic distributor modules 4 to one another nonreleasably. The line rupture monitor 3 likewise does not have to consist of individual exchangeable line rupture monitor modules 7, but can likewise be configured in one piece. The line rupture monitor 3 can then be placed as it were as an entirety onto the basic distributor 2. Finally, it can also be provided that the line rupture monitor 3 is configured in one piece with the basic distributor 2.

The individual detection devices 31 which are provided in each line rupture monitor module 7 can be seen particularly clearly in FIG. 5. If the detection devices 31 have electric means, the empty modules 10 preferably also comprise corresponding boards with conductor tracks, with the result that signals which are generated by a detection device 31 can be forwarded from one line rupture monitor module 7 to the adjacent line rupture monitor module, for example via a bus. To this end, the individual line rupture monitor modules can have, for example, plug connections or the like. However, the signal transmission between the individual line rupture monitor modules can also take place optically. In this way, all the line rupture monitor modules 7 of a line rupture monitor 3 can be connected, in particular via a connection piece 37 which is provided on the end piece 8c, to a suitable evaluation device which, for example, carries out the evaluation of the signals which are generated by the detection devices 31. As has been said, the detection devices 31 can also be connected to a common bus, with the result that it can be detected exactly which line rupture monitor module 7 reports a line rupture. To this end, each line rupture monitor module 7 preferably has an address, via which the line rupture monitor module 7 can be actuated. As has already been explained above, it is also conceivable to embody the position detection device 31 optically. To this end, for example, a light barrier and suitable mirror faces can be provided in the individual line rupture monitor modules 7, which light barrier triggers a corresponding signal in the event of a displacement of the feeler plunger 15, which signal indicates to the operator that a pressure drop is to be observed in the corresponding distributor outlet 12, which pressure drop can be caused by a line rupture, for example.

FIG. 6 shows an exploded illustration of a line rupture monitor 3 according to the invention. Identical parts are provided with identical designations, with the result that reference is made to this extent to the description with respect to the preceding figures, in order to avoid repetitions.

The line rupture monitor 3 in accordance with the illustration according to FIG. 6 has a total of four functional line rupture monitor modules 7; functional is to be understood as meaning that said line rupture monitors 7 can actually detect a line rupture in the associated lines and/or a pressure drop in the connection element 9, that is to say have a detection device 31. Furthermore, an empty module 10 is provided which essentially serves to close a gap between two functional line rupture monitor modules and to produce a signal transmission path or a communications link between them. To this end, an empty module can be configured for cable routing and/or can have dedicated electric or optical means for data and/or power transmission. It becomes clear that the line rupture monitor 3 has two rows of line rupture monitor modules 7 which are arranged substantially in parallel to one another, it being possible for the number of line rupture monitor modules 7 to be different in each row, as is the case in the embodiment according to FIG. 6.

In order to connect in each case two adjacent line rupture monitor modules 7 to one another electrically or optically, corresponding connecting means are preferably provided which are configured in FIG. 6 by way of example as plug connectors S which can be arranged in correspondingly configured receptacles in the adjacent line rupture monitor module 7.

Furthermore, the individual line rupture monitor modules 7 and 10 are preferably connected to one another by means of three end pieces 8a, 8b and 8c, it being possible to choose between the end pieces 8b and 8b'. The end piece 8a connects both rows of the line rupture monitor modules 7 to one another and therefore produces as it were a serial connection between them. The end pieces 8b' and 8c have connection pieces 37, the connection pieces serving to connect the line rupture monitor 3 to a power source or a computer unit or the like. In principle, it is sufficient if one of the end pieces has a connection piece 37, with the result that, for example, the end piece 8b' can be replaced by the end piece 8b which does not have a connection piece 37. It goes without saying that it is also conceivable that each line rupture monitor module 7 is actuated separately.

All the line rupture monitor modules 7 are connected to one another via connecting means 38, in particular via screws, which are preferably fastened to one of the end pieces and interact with the corresponding holes 36 of the line rupture monitor modules 7. FIG. 6 makes it clear that as many line rupture monitor modules 7 and empty pieces 10 as desired can be connected to one another in any desired combination. Merely the connecting means 38 have to have their length adapted accordingly to the number of line rupture monitor modules 7 which are provided. All the electrically and/or optically configured detection devices 31 are preferably likewise connected to one another via suitable connecting means and are connected via connection pieces 37 either to one or more other line rupture monitors and/or to an evaluation device, a display device, a power supply device, for example a voltage source, and the like. To this end, at least one of the end pieces 8a, 8b or 8b' or 8c preferably has a connection piece 37. The end pieces can serve for cable routing and/or have other means for data and/or power transmission.

The individual line rupture monitors 7 and/or their detection devices 31 can also be connected to one another via a common data bus. Via the common bus, the line rupture monitor modules 7 can send, in particular, information items which indicate the state of the associated line. Furthermore, each line rupture monitor 7 can be allocated an address, with the result that each signal which is sent via the bus can be assigned uniquely to a defined line rupture monitor 7. If a line rupture monitor module 7 detects a line rupture and/or a pressure drop, the fault signal which is sent thereupon can be assigned by an evaluation device uniquely to a defined line rupture monitor 7 and the associated line, with the result that the operator knows immediately which line is affected.

Various counterbalance valves 39a, 39b and 39c can be provided for connection to the connection elements 9. For example, one counterbalance valve 39a can be of straight configuration. The use of a rotatable counterbalance valve 39b or of a pivotable counterbalance valve 39c is also conceivable. The rotatably or pivotably configured counterbalance valves 39b and 39c are particularly advantageous because, as a result, even poorly accessible lubricating points can be supplied with lubricant. Counterbalance valves of this type are known from the prior art, with the result that they are not to be described in greater detail here. It is critical merely that a connection element 9 does not have to be connected directly to an associated line, but rather can also be connected to a counterbalance valve which in turn is connected to an associated line.

Figure 7:
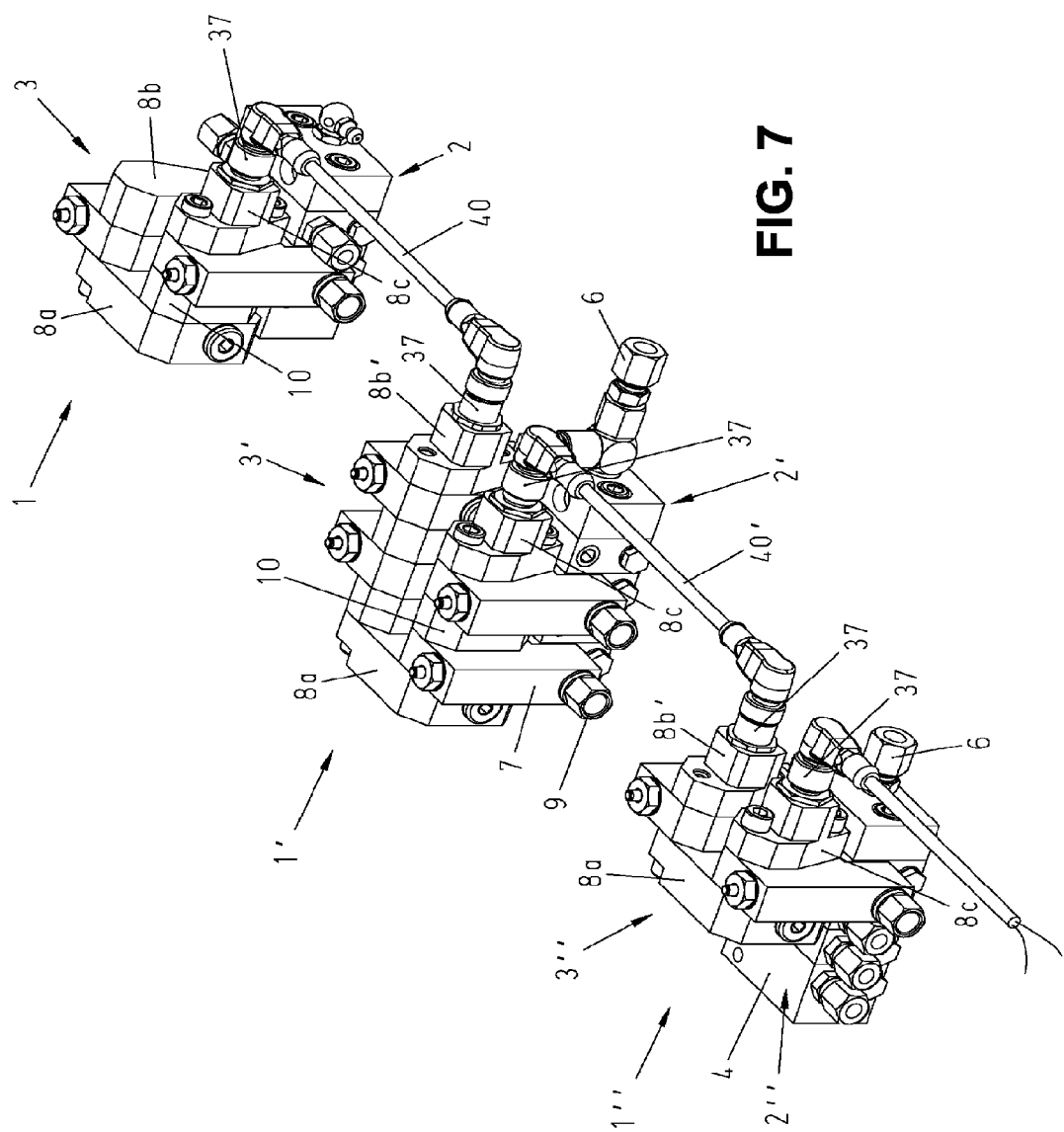
FIG. 7 shows a lubricant distributor system having a plurality of lubricant distributors.

FIG. 7 shows a perspective illustration of a lubricant distributor system having a plurality of lubricant distributors which are connected to one another. Identical parts are provided with identical designations, with the result that reference is made to this extent to the description with respect to the preceding figures.

In FIG. 7, a total of three lubricant distributors 1, 1' and 1" are provided by way of example which are connected to one another via lines 40 and 40'. Here, each lubricant distributor 1, 1', 1" has a line rupture monitor 3, 3', 3" and a basic distributor 2, 2', 2". Each of the lubricant distributors 1, 1' and 1" is of different construction, that is to say each lubricant distributor has line rupture monitors 3, 3' and 3" and basic distributors 2, 2' and 2" of different configuration.

The advantageous modular construction both of the basic distributor 2 and of the line rupture monitor 3 can be seen clearly in FIG. 7. As a result of the modular construction of a lubricant distributor 1, 1', 1", the latter can supply as many lubricating points as desired, namely by virtue of the fact that any desired number of basic distributor modules 4 and line rupture monitor modules 7 can be provided and they can be combined in any desired manner. As a result of the advantageous modular construction of the line rupture monitor 3, 3' and 3" by joining the line rupture monitor modules 7 and 10 together in any desired manner, it is possible in an advantageous way, moreover, to provide each basic distributor 2 with as many line rupture monitor modules 7 as desired. It is also possible here, as shown in the lubricant distributor 1", that individual basic distributor modules 4 are not assigned a line rupture monitor module 7.

FIG. 7 also makes it clear that the end pieces 8a, 8b, 8b' and 8c connect in each case two rows of the line rupture monitor modules 7 to one another in series, whereas a connection between individual lubricant distributors 1 or between the line rupture monitor modules 3 of individual lubricant distributors 1 can be produced via connection pieces 37. A lubricant distributor 1, such as the lubricant distributor 1', can have, for example, two connection pieces 37, with the result that it can be connected to two lubricant distributors 1 and 1". If a lubricant distributor, such as the lubricant distributor 1, is to be connected only to one further lubricant distributor 1', it is sufficient if it has only one connection piece 37 and the other row of the line rupture monitor modules is terminated by way of an end piece 8b which does not have a connection piece 37.

As has already been mentioned in the introduction, the line rupture monitor can be configured in one piece with the basic distributor. However, it is particularly advantageous if the line rupture monitor can be connected releasably to the basic distributor 2 and the line rupture monitor 3 comprises at least one, but preferably a plurality of line rupture monitor modules 7. The line rupture monitor modules 7 are preferably of disk-shaped configuration, the thickness of a disk corresponding substantially to the thickness of a basic distributor module 4, from which the basic distributor 2 according to the present embodiment is composed.

As a result of the modular configuration of the line rupture monitor 3, individual line rupture monitor modules 7 can be replaced simply; for example, a functional line rupture monitor module 7 can be replaced by a nonfunctional line rupture monitor module 7, that is to say an empty module 10, if this is necessary. In this way, for example, only important lubricating points can be monitored by functional line rupture monitor modules 7. The remaining lubricating points and/or distributor outlets are assigned empty modules 10. The line rupture monitor modules 7 are particularly preferably connected operatively to a connection element 9 of the basic distributor 2, which connection element 9 can be arranged in a distributor outlet 12 of the basic distributor 2 and in a through hole 13 of a line rupture module 7. The line rupture monitor module 7 can preferably be fastened particularly simply by means of the connection element 9 to the basic distributor 2 or to an individual basic distributor module 4.

A line rupture monitor 3 preferably comprises at least one detection device 31, but it is preferably provided that each line rupture monitor module 7 comprises a detection device 31. The detection device 31 is configured for detecting a pressure drop in an associated connection element 9 and for generating a corresponding signal which gives information about a corresponding line rupture. In the exemplary embodiment which is shown in the figures, a line rupture is detected via a feeler plunger 15 which is held by the fluid pressure, counter to the force of a spring, in a "normal position" which is detected by the detection device, for example by means of an electric switch or by optical means. If the spring force of the spring 17 exceeds the fluid pressure, for example because the latter drops on account of a line rupture, the feeler plunger 15 is displaced by the spring force in the direction of the connection element 9, with the result that a radial element 32 is no longer in contact with the detection device 31. Thereupon, the detection device will generate a corresponding signal which indicates the displacement of the feeler plunger 15 and therefore the pressure drop in the connection element 9. The detection devices 31 of the individual line rupture monitor modules 7 are preferably connected to one another. For this purpose, any empty modules 10 which are provided also have corresponding electric and/or optical means for signal transmission.

It is particularly advantageous if the line rupture monitor 3 is of modular construction, with the result that any desired combination of line rupture monitor modules 3 is possible. Furthermore, an existing basic distributor 2 can be retrofitted simply with a line rupture monitor 3, in order to produce a lubricant distributor 1 according to the invention. The retrofitting can take place simply by virtue of the fact that the distributor outlets 12 of a basic distributor 2, the associated lines of which are to be monitored, are provided with a line rupture monitor 3 or with a line rupture monitor module 7. To this end, the line rupture monitor modules 7 preferably have connection elements 9 which only have to be introduced, in particular screwed, into the corresponding distributor outlets 12. In order to retrofit existing basic distributors 2, a line rupture monitor 3 or a line rupture monitor module 7 therefore preferably already has a corresponding connection element 9 which has an opening 27, in order to produce a fluid connection between the hole 16 which receives the feeler plunger 15 and the fluid chamber 23 of the connection element 9.

All the lubricant distributors which are provided in a central lubrication system or their line rupture monitors 3 or line rupture monitor modules 7 are preferably connected to one another and to a corresponding evaluation system which is not shown in the drawing. In this way, an operator can be shown, for example, by a display element which of the line rupture monitor modules 7 has detected a line rupture. Rapid locating of the affected line rupture monitor module 7 and therefore of the associated line is possible by virtue of the fact that each individual line rupture monitor module 7 can be addressed in the case of a connection of the individual line rupture monitor modules 7 via a common bus.

According to the invention, the line rupture monitor 30 can be arranged in the basic distributor 2 or on the latter. It is conceivable, for example, to integrate the line rupture monitor 3 into the basic distributor 2. In order to retrofit basic distributors 2 which already exist, it is more advantageous, however, to arrange the line rupture monitor 3 on the basic distributor 2 and to connect it to the basic distributor 2, in particular, via connection elements 9.

LIST OF DESIGNATIONS 1-1" Lubricant distributor
2-2" Basic distributor
3-3" Line rupture monitor
4 Basic distributor module
4' Starter module
5 Connecting element
6 Inlet element
7 Line rupture monitor module
8a-8c End piece
9 Connection element
10 Empty module
11 Hole
12 Distributor outlet
13 Through hole
14 Side face
15 Feeler plunger
16 Hole
17 Spring
18 Upper side
19 Projection
19' Projection
20 Stop element
21 Upper side
22 Arrow
23 Fluid chamber
23' Fluid chamber
24 Closure
25 Elastic element
26 Closure element
27 Opening
28 Hole section
29 End side
30 Relief hole
31 Detection device
32 Radial element
33 Cavity
34 Board
36 Hole
37 Connection piece
38 Connecting means
39a Counterbalance valve
39b Counterbalance valve
39c Counterbalance valve
40 Line
40' Line
S Plug connection
K Contact element

The invention claimed is:

1. A lubricant distributor for conveying and distributing lubricant from a lubricant source via one or more lines to one or more lubricant supply points, the lubricant distributor comprising at least one removable or exchangeable modular rupture monitor and a basic distributor comprising at least one distributor outlet and a connection element assigned to each distributor outlet; wherein the basic distributor and the at least one line rupture monitor are removably connected to provide a rigid unit; wherein the at least one line rupture monitor comprises at least one line rupture monitor module, the line rupture monitor module removably connected to a connection element, for ease of combination of modules and retrofitting of modules, the rupture module removably assigned to a distributor outlet of the basic distributor and each of the at least one line rupture monitors comprises a detection device comprising electrical components, optical components, or both electrical and optical components and is configured and adapted to detect a pressure drop in the connection element, wherein each line rupture monitor module is operatively connected to a connection element, the connection element is configured in such a way that the lubricant is guided out of the distributor outlet via a bypass fluid path which is formed by an opening on the wall of the connection element, a hole section and a relief hole provided in the line rupture monitor module, the hole section is connected at one end to the opening and connected at another end to the relief hole.

2. The lubricant distributor as claimed in claim 1, wherein the at least one line rupture monitor module has a disk-shaped configuration.

3. The lubricant distributor as claimed in claim 1, wherein the distributor comprises at least one empty nonfunctional module comprising no electrical or optical components serving to close a gap between two functional line rupture monitor modules and producing a signal transmission path between two functional line rupture monitor modules.

4. The lubricant distributor as claimed in claim 3, wherein the line rupture monitor module comprises a feeler plunger spring-mounted within an opening in a lubricant channel, such that the feeler plunger is positionable counter to the force of the spring.

5. The lubricant distributor as claimed in claim 4, wherein the position of the feeler plunger is dependent on the fluid pressure within the opening in the lubricant channel.

6. The lubricant distributor as claimed in claim 1, wherein each of the at least one distributor outlets is assigned a line rupture monitor module.

7. The lubricant distributor as claimed in claim 1, wherein the basic distributor is configured as a progressive distributor.

8. A central lubrication system for machines, vehicles, construction or agricultural machines comprising a lubricant distributor as claimed in claim 1.

9. The lubricant distributor as claimed in claim 1, wherein the at least one line rupture monitor comprises at least one line rupture monitor module the connection element is configured in such a way that it does not produce a direct connection between the distributor outlet and a line which is connected to the connection element.

10. A lubricant distributor for conveying and distributing lubricant from a lubricant source via one or more lines to one or more lubricant supply points, the lubricant distributor comprising at least one rupture monitor and a basic distributor comprising at least one distributor outlet and a connection element assigned to each distributor outlet; wherein the basic distributor and the at least one line rupture monitor are removeably connected to provide a rigid unit; wherein the at least one line rupture monitor comprises at least one line rupture monitor module, the line rupture monitor module removeably connected to a connection element, for ease of combination of modules and retrofitting of modules, the rupture module removably assigned to a distributor outlet of the basic distributor and each of the at least one line rupture monitors comprises a detection device comprising electrical components, optical components, or both electrical and optical components and is configured and adapted to detect a pressure drop in the connection element, wherein each line rupture monitor module is operatively connected to a connection element, the connection element is configured in such a way that the lubricant is guided out of the distributor outlet via a bypass fluid path which is formed by an opening on the wall of the connection element, a hole section and a relief hole provided in the line rupture monitor module, the hole section is connected at one end to the opening and connected at another end to the relief hole.

* * * * *